United States Patent
Gebhardt et al.

[11] Patent Number: 5,609,534
[45] Date of Patent: Mar. 11, 1997

[54] INFORMATIONAL/TRAINING VIDEO SYSTEM

[75] Inventors: William J. Gebhardt; James P. Thome, both of Fort Collins; Leslie C. Hildenbrandt, Windsor, all of Colo.

[73] Assignee: The Distancecaddy Company, L.L.C., Ft. Collins, Colo.

[21] Appl. No.: 326,787

[22] Filed: Oct. 20, 1994

[51] Int. Cl.$^6$ .................................................. A63B 57/00
[52] U.S. Cl. ............................................................ 473/409
[58] Field of Search ........................... 273/183.1, 35 R, 273/184 R; 364/410; 434/247, 252, 257; 358/335; 473/409

[56] References Cited

U.S. PATENT DOCUMENTS

| | | | |
|---|---|---|---|
| 3,408,750 | 11/1968 | McCollough et al. | 434/252 |
| 3,438,031 | 4/1969 | Fathauer | 343/8 |
| 3,508,440 | 4/1970 | Murphy | 73/379 |
| 3,938,809 | 2/1976 | Gentiluomo | 273/176 |
| 4,137,566 | 1/1979 | Haas et al. | 364/410 |
| 4,276,548 | 6/1981 | Lutz | 343/7 |
| 4,545,576 | 10/1985 | Harris | 273/25 |
| 4,673,183 | 6/1987 | Trahan | 273/176 |
| 4,688,105 | 8/1987 | Bloch et al. | 358/335 |
| 4,841,378 | 6/1989 | Cogert | 358/335 |
| 4,858,922 | 8/1989 | Santavaci | 273/26 |
| 4,891,748 | 1/1990 | Mann | 364/410 |
| 5,082,263 | 1/1992 | Berger | 273/29 |
| 5,092,602 | 3/1992 | Witler et al. | 273/184 |
| 5,134,496 | 7/1992 | Schwab et al. | 358/355 |
| 5,177,721 | 1/1993 | Cochrane | 369/34 |
| 5,210,603 | 5/1993 | Sabin | 358/93 |
| 5,246,232 | 9/1993 | Eccher et al. | 273/184 |
| 5,278,662 | 1/1994 | Womach et al. | 358/335 |

OTHER PUBLICATIONS

"DistanceCaddy" brochure distributed by Colorado Time Systems, Inc.

Primary Examiner—Jessica Harrison
Assistant Examiner—Michael O'Neill
Attorney, Agent, or Firm—Sheridan Ross P.C.

[57] ABSTRACT

The present invention provides a video-based, combined informational/training system for user activity related applications. In one embodiment, the system (2) includes a video recording assembly (10) and a measuring device (4) located at a user activity site (6) such as a tee box of a golf driving range. A video tape (60), including activity specific information on a first, pre-recorded portion thereof, is provided to the user for use in the video recording assembly (10) at the user activity site (6). The video tape (60) is cued for recording user specific information on a second portion of the video tape (60) during a practice session. The sensor (4) determines corresponding parameter information, such as estimated golf ball carry distance, for display on video tape (60). The video tape (60) and video recording assembly (10) cooperate to provide a mechanism for preventing or discouraging use of unauthorized tapes and to ensure proper usage of the system (2).

23 Claims, 10 Drawing Sheets

INFORMATIONAL/TRAINING VIDEO SYSTEM

FIELD OF THE INVENTION

The present invention relates to the utilization of video technology to provide a combination of pre-recorded activity related information and user-specific feedback typically pertaining to such activity, and is particularly apt for education and training in sporting activities, such as golf, tennis and softball/baseball hitting.

BACKGROUND OF THE INVENTION

With the increasing availability of video recording/playback equipment, such as video cassette recorders (VCRs), compact disc (CD) players and charge-coupled device (CCD) based and other video cameras, video technology has found a variety of applications for independent user recording or review. Perhaps the most widespread of such applications is home entertainment, including home use of pre-recorded movies and other video products stored on video tape, CDs, computer discs or other video media. Such video products have also been employed for informational uses such as educational videos, instructional videos and consumer information videos. Relatedly, video products have been used to facilitate learning or training in various activities. See, e.g., U.S. Pat. No. 5,210,603 relating to a device for recording a golf swing.

Generally, conventional applications of video technology and related video products fall into two categories. The first category involves general, pre-programmed subject matter, for example, movies and educational videos. The other category involves user programmed subject matter, for example, home videos. In the former category, the video product functions as a medium for conveying a video-based work, often of a proprietary nature, and is intended for viewing only. In the latter category, the associated video product is ordinarily provided as a blank for receiving video subject matter as selected and formatted by the user.

SUMMARY OF THE INVENTION

It is an objective of the present invention to provide a video-based combined informational/training system for user activity-related applications.

It is a further objective of the present invention to provide a system which yields a video tool containing activity-specific information and corresponding video recorded user-specific training and feedback information typically pertaining to such activity.

Additional objectives of the present invention will be apparent upon consideration of the description below.

In one aspect, the system of the present invention comprises a method for providing a combined informational and training video product corresponding to an activity performed by a user. According to the method of the present invention, a first informational video segment including activity specific information is recorded on a first portion of the video record of a video unit such as a video tape. For example, a pre-recorded golf instructional segment can be provided at the beginning of the video record as described below. The video unit is provided to a user for use in a video recording assembly disposed at a user activity site such as a golf driving range. In order to ensure proper use, the video unit is cued, e.g., at the time of recording the pre-recorded segment or later, for further recording on a second portion of the video record different than the first portion. This cueing can be accomplished automatically, for example, via detection of appropriate signals encoded into the video record, or the cueing can be performed manually in conjunction with recording the pre-recorded segment or by the end user or by an owner/lessee of the video system. The user can then utilize the recording assembly to record an activity performed by the user, for example, a practice session. The resulting video unit is then provided to the user for independent replay, such as on a home video system. The user thus receives a video product including a combination of activity-specific information and user-specific information for training and feedback.

The system of the present invention can be used in connection with a variety of activities where training and feedback is desirable, for example, sporting activities such as golf, tennis and softball/baseball hitting and non-sporting activities such as public speaking and employment training. In this regard, the first video record portion can provide instructional information regarding the user activity, information regarding products or equipment for use in connection with the activity and/or other activity-specific information. This activity-specific information can be provided before, after or interspersed with the user-specific information as desired. The video recording assembly, which comprises at least one film-based or digital camera or other video recorder, is arranged relative to a particular user activity site, such as a golf tee box, baseball batting cage, speaking podium or the like, to record the activity performed by the user.

By way of example, in a golf application, the first video record portion may include a first subportion comprising a recording of an expert golfer demonstrating and otherwise teaching particular golf swing mechanics and other golfing techniques, and a second subportion directed to particular golf products. In the second, user-specific video record portion, the end user can record a practice session, for example, employing the subject golf products. The end user is thus provided with a video product that includes instructional and product information in conjunction with user specific feedback. The end user can thereby reflect on the particulars of a practice session in relation to the pre-recorded information and, through repeated viewings and freeze frame reviews if necessary, the end user can identify and correct technical errors in his or her game and select golf equipment tailored to optimize his/her performance. The end user thereby receives a golfing aid which, in many ways, is superior to even individual expert instruction.

The system is particularly apt for use in connection with a distribution network where the first informational video segment is pre-recorded on a master video unit. The first informational video segment can then be copied onto a number of video units provided to one or more outlets, such as commercial driving ranges, thereby allowing for certain economies of scale.

According to another aspect, the system of the present invention provides information regarding a selected parameter of the activity performed by the user and/or information derived or otherwise based thereon. This is accomplished by incorporating a measuring device for measuring a physical attribute regarding a specific activity (e.g., golf ball velocity, relative velocity or velocity component and/or other ball/swing parameters), utilizing the physical attribute measurements to determine corresponding activity specific information (e.g., estimated golf ball carry distance or recommended golf club shaft composition or stiffness), and implementing a feedback mechanism for reporting to the user the measured or corresponding information, preferably on the video record (e.g., superimposed on the video taped image portion corresponding with the measured activity or in table form in a separate portion of the video record). Parameter information can thereby be displayed on the video record to provide contemporaneous or other feedback related to the recorded activity. A processor can be advantageously employed to utilize and store attribute measurements and provide corresponding activity-specific information utilizing preprogrammed databases and routines.

For example, in one embodiment, the system of the present invention provides information regarding golf ball carry distance on a per shot basis or relative to a series of shots or an entire practice session. The system includes a device for measuring an attribute relative to golf ball carry distance, such as a radar based or other detector for measuring golf ball velocity or component(s) thereof, trajectory and the like. The measured attribute can be processed by a processor to yield a variety of types of parameter information. In this regard, estimated golf ball carry distance can be determined for simultaneous display or the measured attribute can be downloaded into processor memory for further processing to provide an average carry distance over a series of shots and/or arrangement of accumulated data in a table or graphic format. This information can further be processed to determine which, of a series of clubs, provides the greatest average carry distance or the information can be communicated to stored analysis programs so as to provide information regarding the optimal golf club characteristics for the user. For feedback purposes, the parameter information can be reported to the user by printing a hard copy record, superimposing the information on the video record or otherwise displaying the information on a portion or portions of the video record.

According to a further aspect, the video recording assembly and the video product of the invention cooperate so as to allow proper use of the system to be monitored and to discourage or prevent erasure of the video record and use of unauthorized video units in the video recording assembly. The video product is provided with an indicator to indicate that the video product is authorized for use in the video recording assembly at the user activity site. For example, the indicator can comprise a signal encoded into the video record (e.g., an audio, optical or magnetic signal) or a recognizable physical or signal generating/responding feature of the video product (e.g., a pull tab or bar code on the product casing or an LED or photodetector associated with the product) whereby recording on the video record or a portion thereof is selectively allowed. In use, the video recording assembly automatically investigates the video product, such as by probing or scanning the video product or analyzing the video record signal, to determine whether the indicator is present and responds, if the indicator is detected, by allowing the video recording assembly to be used to record user-specific information on the second portion of the video product.

If desired, provision can be made for modifying this authorization screening process periodically so as to prevent or discourage use of a particular video unit indefinitely. For example, where the indicator comprises a bar code, the authorization code can be changed as part of a regular maintenance program. Alternatively, where the indicator comprises an audio signal, such as a sub-audible tone recorded in the video record, and a corresponding audio detector is provided for investigating the video unit, repeated use of the unit can be prevented or discouraged by recording a second audio signal on the video unit during the unit's first use. The video recording assembly can then be programmed to only allow use of units having the first audio signal and to disallow use of units having the second audio signal.

The present invention thus advantageously provides a video-based system for user activity-related applications. Additionally, the present invention yields a video tool including both activity-specific information and user-specific information for independent user review.

BRIEF DESCRIPTION OF THE DRAWINGS

Additional objectives and advantages of the present invention will be apparent upon consideration of the following description taken in conjunction with the drawings in which.

DETAILED DESCRIPTION OF THE PREFERRED EMBODIMENT

Figure 1:
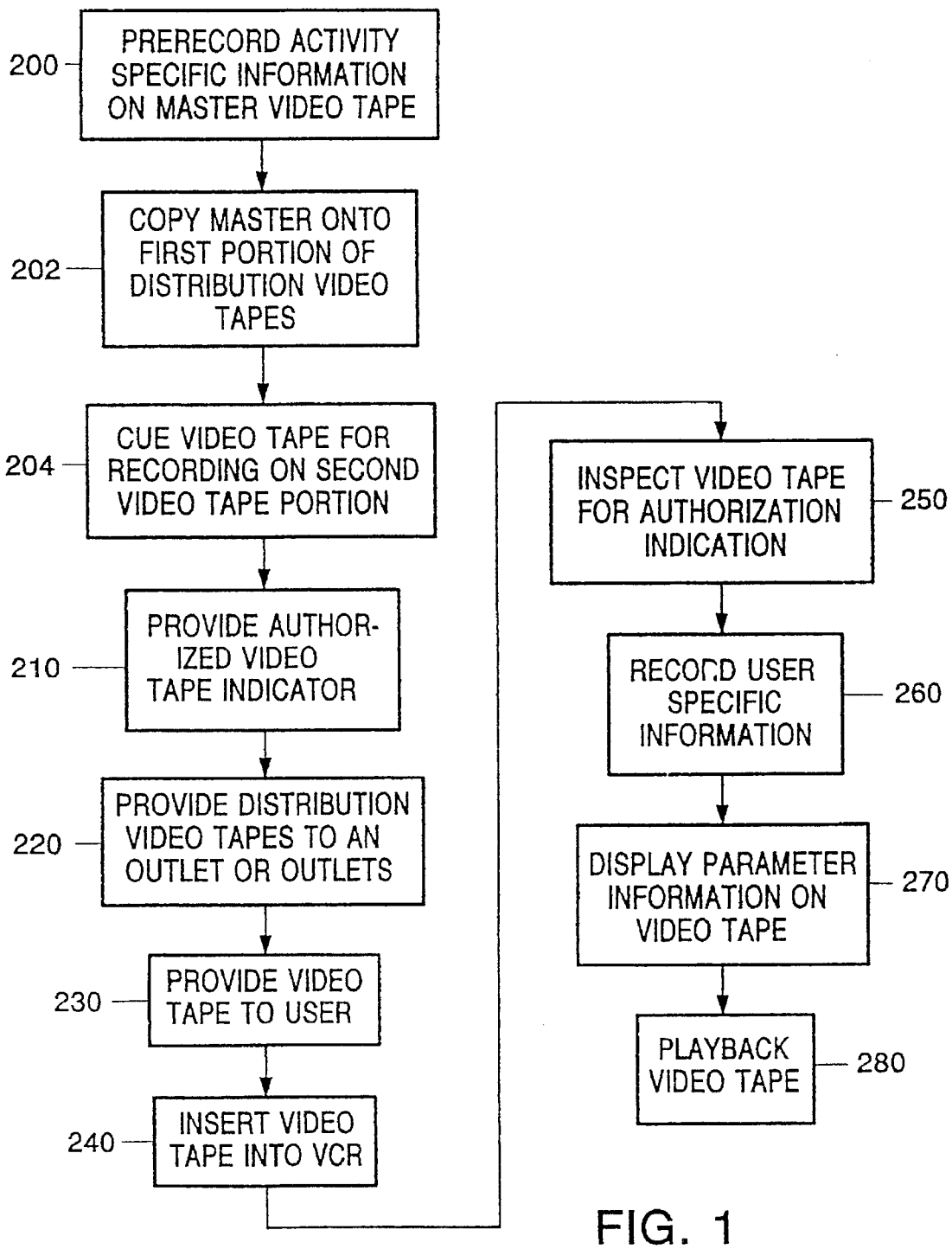
FIG. 1 is a flowchart diagram of a method for use in accordance with the present invention.
Figure 2:
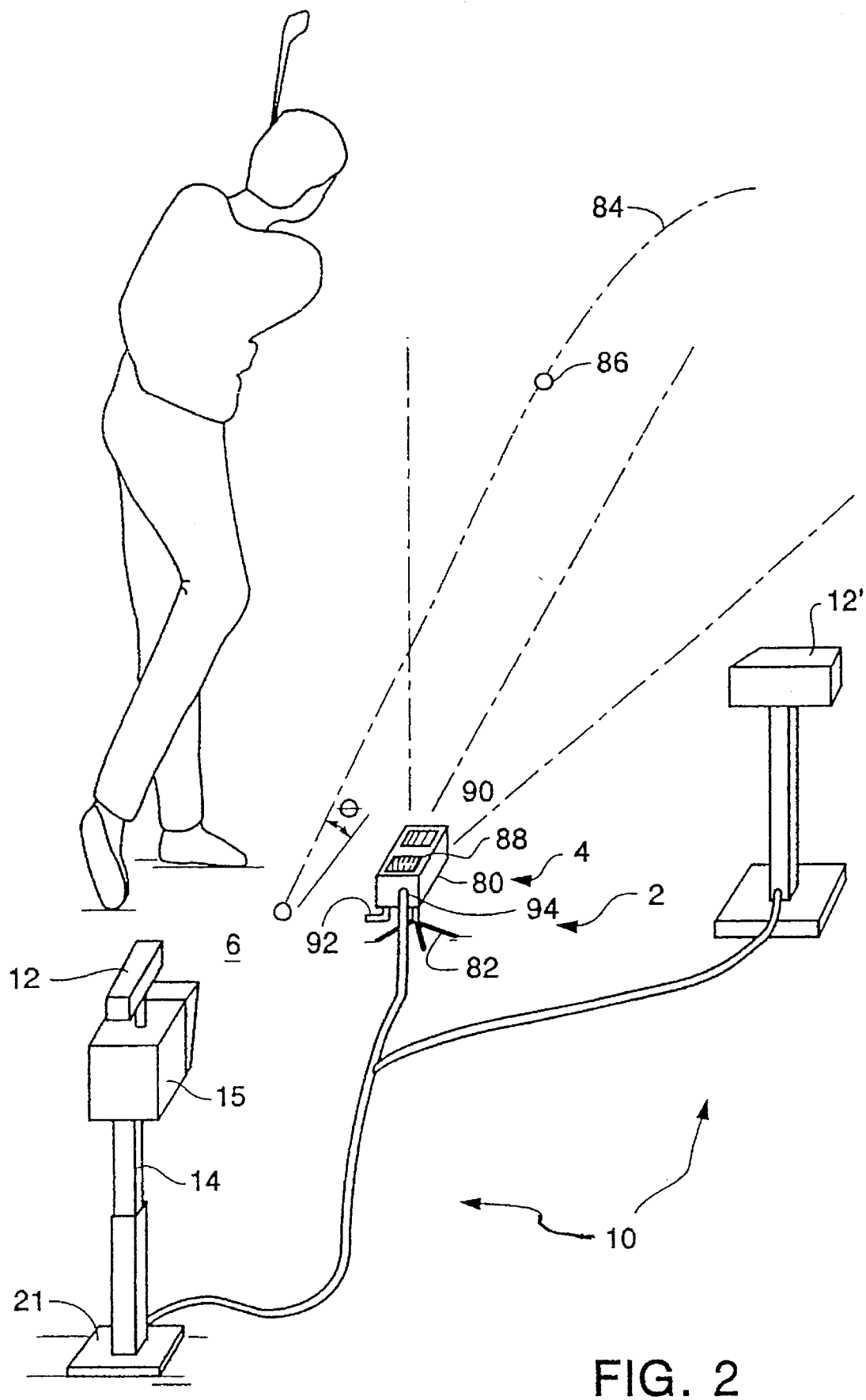
FIG. 2 shows a video-based informational/feedback system constructed in accordance with the present invention.

Referring to FIGS. 1 and 2, a video-based informational/feedback video system 2 and corresponding flow chart diagram illustrating a method for using the system 2 are shown. Although the system 2 and method are specifically described below with respect to an embodiment adapted for golf, it will be appreciated that the invention is useful in connection with a variety of activities where a combined informational/feedback video tool is desirable. Generally, the system 2 comprises a video recording assembly 10 and a measuring device 4, such as a radar based detector for determining projected golf ball carry distance, disposed at a user activity site 6, in this case, a golf tee box, e.g., at a driving range.

In step 200 of FIG. 1, activity specific information is prerecorded on a master video tape. In the illustrated golf-related system, such information can include: instructional information; information regarding golf clubs, golf balls or other golf related gear or equipment; information regarding golf courses, resorts or services; and/or other golf related information. This information can be provided by the system owner/lessee or third parties.

For reasons of efficiency and optimal video quality, the activity specific information can be prerecorded on a master under closely controlled filming conditions using high quality recording equipment. The master video tape can then be copied onto distribution video tapes (step 202) which are provided to an outlet or outlets (step 220) such as driving ranges. In step 210, each individual distribution video tape is provided with an indication that the tape is authorized. For example, as described below, a pull tab provided on the video tape casing, can be removed or one of various other indicators can be provided so that the tape is compatible for use in the video recording assembly 10. This authorization can be provided at the time that the time that the activity specific information is recorded by concurrently recording or mixing a subaudible tone into the video record of the video tape.

To ensure proper sequencing of the prerecorded activity-specific portion and the user-specific portion (the portion recorded by the user at the user activity site 6) of the video record, the video tape is cued, in step 204, for recording on a second video record portion different from the first video record portion which contains the activity specific information. This cueing can be performed by recording personnel who record the activity-specific information. The cueing may be done automatically upon insertion of the video tape or by a driving range operator or other person who is familiar with the video record format. The authorized and prepared video tape is provided to the user in step 230.

At the user activity site 6, the user inserts the video tape into the video recording assembly 10 (step 240) and initiates a practice session as described below. In step 250, the video tape is automatically investigated by the video recording assembly 10 to determine whether the video tape includes an indication to indicate that the tape is authorized. The tape can then be started to record the practice session (step 260). If desired, in step 270, the measuring device 4 associated with the recording assembly 10 can be activated (turned on) by the user to provide parameter information, e.g., estimated carry distance, for display on the video tape. At the conclusion of a practice session, the user ejects the video tape which the user can then retain for independent playback (step 280). In this manner, the user is provided with a video tool including a combination of activity specific information and user specific information for training and feedback.

Figure 3:
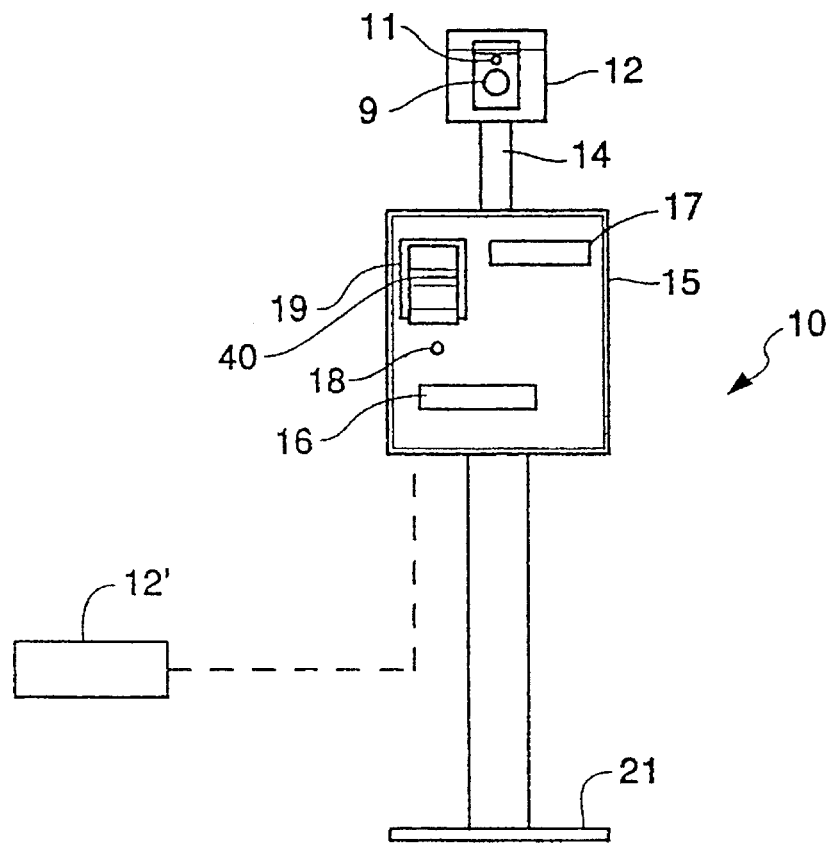
FIG. 3 shows a video recording assembly for use in the system of FIG. 2.

FIG. 3. illustrates the main components of the video recording assembly 10 for recording a golf swing according to one embodiment of the invention. The assembly 10 comprises a base plate 21 which supports a mast 14. A main housing 15 is attached to the mast 14 and holds various electrical components used in the assembly 10. The main housing 15 protects the various electrical components and thus enables permanent outdoor installation. The main housing 15 is discussed further below. A camera housing 12 is adjustably supported by mast 14 so as to enable recording of a practice session. Remote camera housing 12' is positioned as shown in FIG. 2 to provide a front view of the golfer's swing for improved swing analysis. A camera 9 and a microphone 11 are comprised within each of the camera housings 12 and 12' and capture the video and audio of the session, respectively. An internal switch allows the user to record from either the camera 9 and microphone 11 of housing 12 or remote housing 12' onto the video record of the video tape. The video and audio signals output from the selected camera 9 and microphone 11 are provided to a recorder inside the main housing 15, as discussed further below.

The base plate 21 comprises, for example, a square aluminum base plate 2–3 feet across or other appropriate stabilizing means. The illustrated mast 14 is about 5–7 feet and is welded to the center of the base plate 21. If desired, the mast 14 may be provided in a two or more piece telescoping arrangement for height adjustment. The mast 14 provides support for the main housing 15 and camera housing 12. The camera housing 12 preferably has a vertical rotation adjustment allowing it to swivel along an axis running through its center on a horizontal plane. The illustrated camera housing 12 can also be swiveled 360 degrees relative to a vertical axis. Therefore, the camera 9 in the assembly 10 is in a moveable housing 12 on the end of the mast 14 so it can be accurately pre-aimed to capture the correct image, saving the golfer time. Similar adjustment capability may be provided for remote housing 12'. The camera 9 is thus adjustable to allow for various placements. However, the initial position of the camera 9 is such that it typically does not require any involvement from the user. The camera 9 is preferably equipped with an automatic iris adjustment to enable the assembly 10 to be used in a wide variety of lighting conditions (dawn to dusk). In addition, a wide angle lens is preferably used to allow viewing of the golfer's swing as well as a portion of the trajectory 84 of the ball 86 (FIG. 2). The lens is preferably a Computar 2.6 mm lens.

Figure 4:
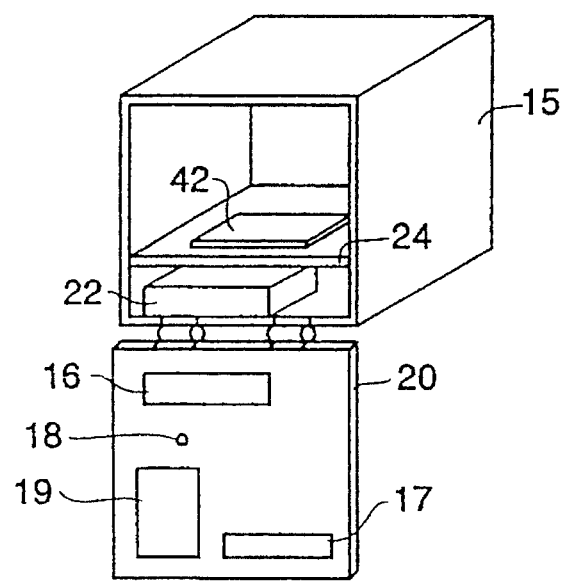
FIG. 4 is a front view of the main housing of the video recording assembly of FIG. 2 with the front hinged panel folded down.
Figure 5:
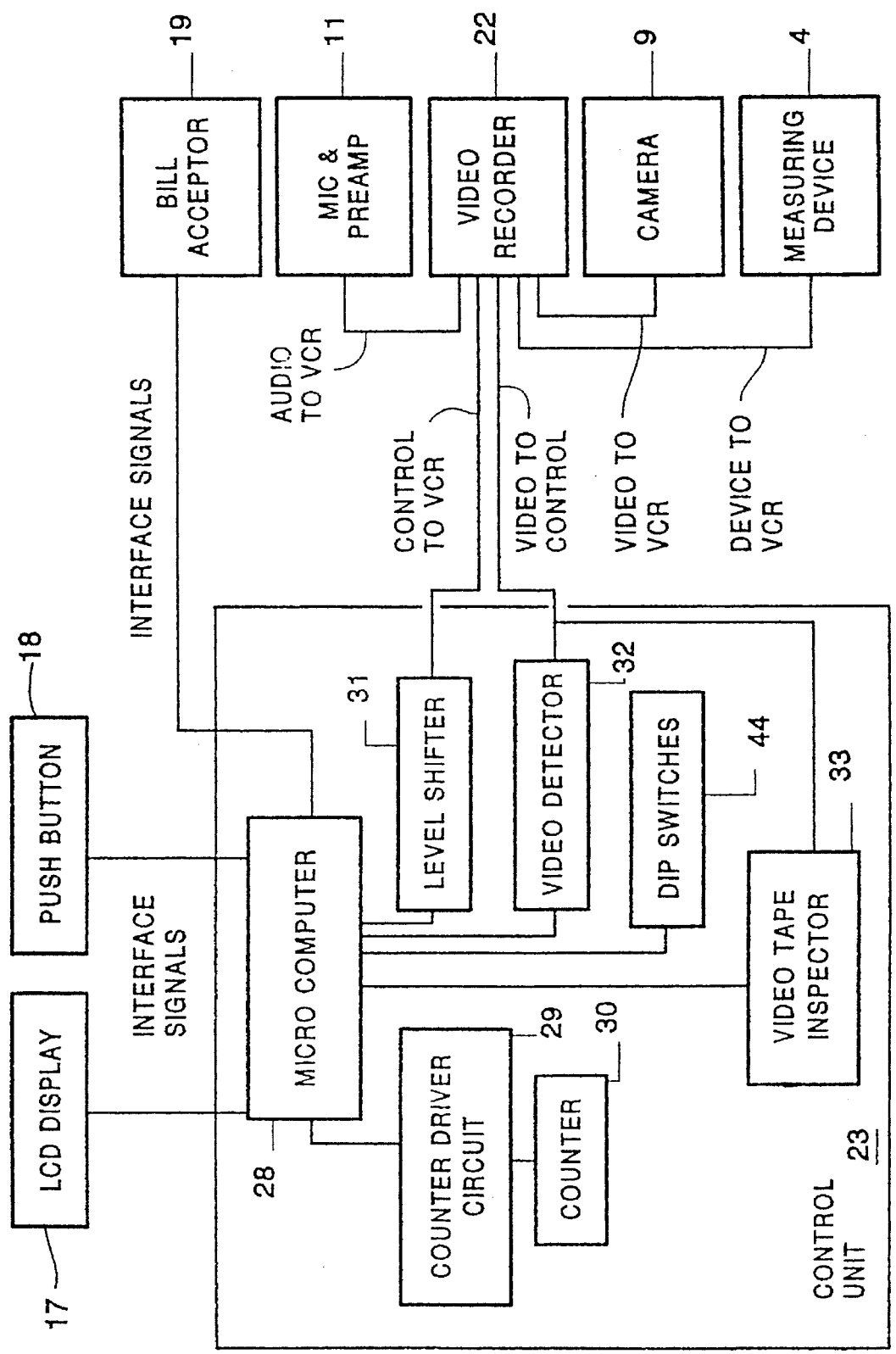
FIG. 5 is a block diagram of the system of FIG. 2.

The main housing 15 is preferably comprised of a hooded aluminum box with a hinged face plate 20 for internal access. A bill acceptor 19 or token acceptor, LCD display 17, control unit, video recorder and miscellaneous transformers and wiring are contained within the main housing 15. The control unit, recorder, and transformer and wiring logic are illustrated in FIGS. 4 and 5. The face plate 20 includes a slot 40 for the bill collector 19 which accepts paper money from a user as well as a slot 16 to allow for insertion and removal of a video tape in the recorder. The face plate 20 also includes an LCD display 17 which provides information to the user, and a record button 18 which the user pushes to begin a recording session and may optionally push to prematurely terminate a recording session. Otherwise the recording session terminates when a preset amount of time has expired. The hinged face plate 20 folds down to allow access to internal electronic components and a money collection area.

Referring now to FIG. 4, the main housing 15 comprises a voltage supply and transformer circuitry 42. The assembly 10 accepts outside electrical power of 120 A.C. from a normal 120 outlet. This power input is preferably converted to 12 V.A.C. by a U.L. certified transformer (not shown) located outside of the assembly 10. The 12 V.A.C. is provided from the outside power source to the main housing 15 of the assembly 10 where it is stepped back up to 120 V.A.C. by a transformer comprised within the logic 42. Transmittal of outside power to the machine at 12 V.A.C. is done primarily for safety and building permit reasons. The 120 V.A.C. is provided to a power strip comprised within the logic 42, supported on shelf 24, to which all of the electrical devices in the assembly 10 are connected. Operation of the internal components of the assembly 10 requires voltage ranging from 5 volts to 120 volts, and thus certain of the components preferably include their own transformer as necessary.

The main housing 15 also includes the video recorder 22. The video recorder 22 is preferably a VHS recorder, although any type of recording medium may be used. In the preferred embodiment, video and audio signals produced by the camera 9 and microphone 11 comprised in the camera housing 12 are transmitted to the video recorder 22 at all times during operation. As shown in FIG. 4, the LCD display 17, control unit 23, and bill acceptor 19 are mounted on the inside of the hinged face plate 20.

The LCD 17 displays a predetermined amount of money required to start the recording process, and the bill acceptor 19 accepts money until the predetermined amount is deposited. The LCD 17 then displays a message to insert a video tape and to press the record button 18. After money and the VHS tape are inserted and the record button 18 is pressed, the amount of record time in the form of a countdown is displayed to the customer on the LCD 17. The session is then recorded until the record button 18 is pressed again or until the time has expired. The video tape is then automatically ejected, and the system resets itself for the next session.

The system 2 can also be equipped to ensure that only authorized video tapes (or other video units) are employed. In this manner, proper use of the system 2 (e.g., correct sequencing of pre-recorded and user recorded segments) can be monitored, erasure of the video tape or a portion thereof is discouraged or prevented and the full benefit of the combined informational/training nature of the resulting video product is realized. Preferably, the mechanism for investigating the video unit is provided such that it does not interfere with normal user playback of the video product on standard video playback equipment and, in this regard, the specific mechanism employed can be varied depending, for example, on the video medium.

A variety of embodiments are possible for implementing this screening process. For example, an electromagnetic characteristic or pattern can be encoded into the video record of the video tape or other medium for detection by a corresponding investigating head of the assembly 10. In one such embodiment, an audio indicator and a corresponding investigator are employed. In this regard, an audio signal, such as a selected sub-audio tone (so as to avoid distraction when played back by the user) is recorded on at least a portion of the video tape. This signal can be recorded on the master and copied onto the distribution copies, or it can be recorded separately. It will be appreciated that the audio signal will be recorded on the video tape as an electromagnetic representation. The assembly 10 is provided with a receiver head for sensing the audio signal as represented on the tape. Based on a comparison of the signal thus detected to a reference (e.g., by supplying the detected signal and a reference signal to a comparator) the assembly 10 responds by allowing recording if the indicator is detected and disallowing recording (e.g., by ejecting the tape) if the indicator is not present. The sensed audio signal can also be fed to the control unit to provide a positive indication that recording has begun. Similar means can be employed to allow for one-time-only use of the video tape. This can be accomplished, for example, by causing the assembly 10 to record a second audio signal on the tape concomitantly with the practice session recordation, e.g., by audio mixing. The assembly 10 then responds to the presence of the second signal, like the absence of a first signal, by disallowing recording.

In a further embodiment, the video tape casing is provided with a bar code and a conventional bar code scanner is incorporated into assembly 10. Authorization information is thus provided via the bar code. It is an advantage of embodiments such as the audio signal embodiment described above and the bar code embodiment that the authorization code or indicator can be changed periodically, thus preventing use of a video tape indefinitely.

Figure 8:
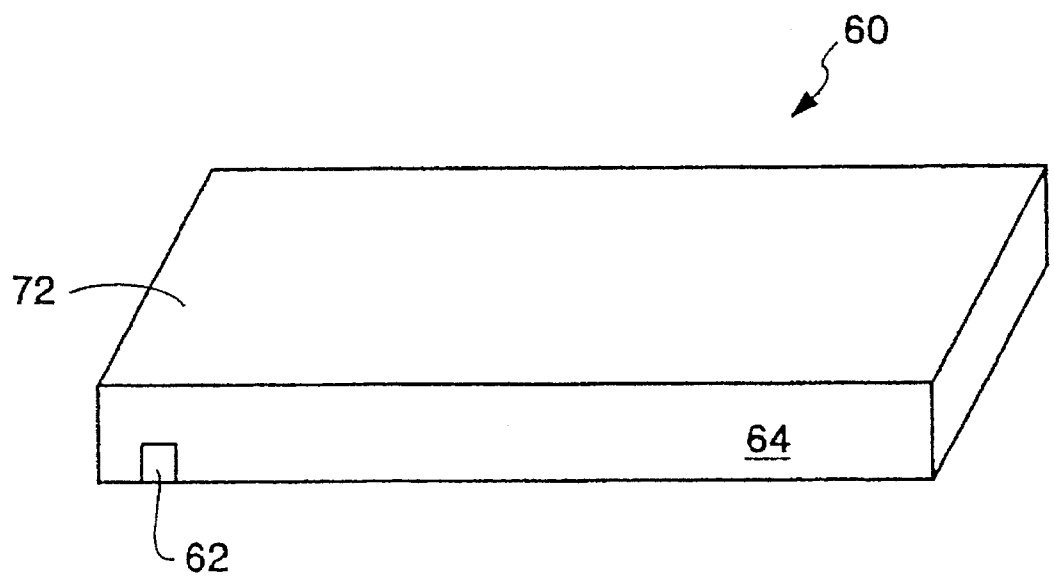
FIG. 8 is a perspective view of a video tape of the system of FIG. 2.
Figure 9:
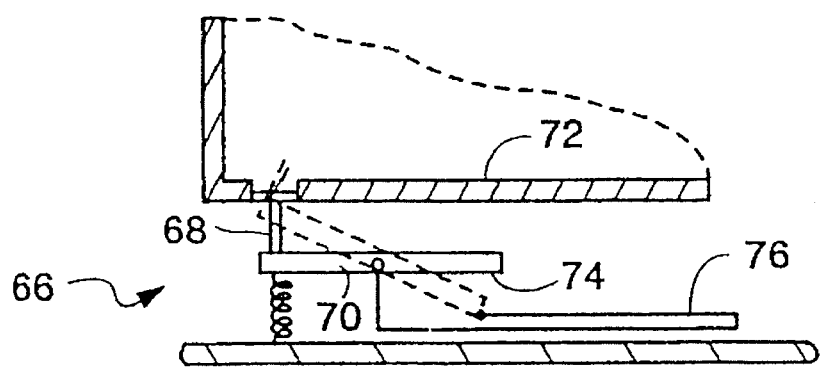
FIG. 9 illustrates a mechanism for inspecting the video tape of FIG. 8.

Referring to FIGS. 8 and 9, a further embodiment of such a screening mechanism for use in connection with conventional video tape/VHS products, as employed in the system 2, is shown. FIG. 8 shows a rear perspective view of a video tape 60 for use in the system 2. The video tape 60 includes a pull-tab 62 located at a predetermined position on a rear panel 64 thereof. Conventionally, the pull tab 62 is provided so that a user can designate whether or not erasure or further recording can occur on a particular tape. That is, by breaking off the pull tab 62, a user can preserve the existing status of the tape. Conventional video players automatically probe the tape upon insertion to determine whether the pull tab 62 has been removed and respond, if the tab 62 has been removed, by disabling the recording function thereby preventing further recording or erasure.

The illustrated pull tab 62 of video tape 60 cooperates with an internal probe mechanism 66 of the video recorder 22 as shown in FIG. 9 so as to provide an indication that the tape 60 is authorized for use in the system 2 at user activity site 6. It will be appreciated that a variety of such probing mechanisms are used, and further embodiments may be developed. The embodiment of FIG. 9 is one exemplary embodiment. The probe mechanism includes a probe member 68 mounted on a spring-loaded, pivotable lever arm 70 so that the probe 68 is urged against the video tape housing 72. The lever arm 72 includes a contact 74 associated with a lead 76 to establish a connection when probe member 68 penetrates the housing 72 where the tab 62 has been removed, thereby providing an electrical signal indicating that the tape is authorized. The circuitry of the video unit is thereby enabled to record upon activation by the user. If desired, the resulting signal or lack thereof can be communicated to microcomputer 28 to trigger display of an appropriate message on the LCD 17, e.g., "ready" or "please insert authorized tape".

Figure 11:
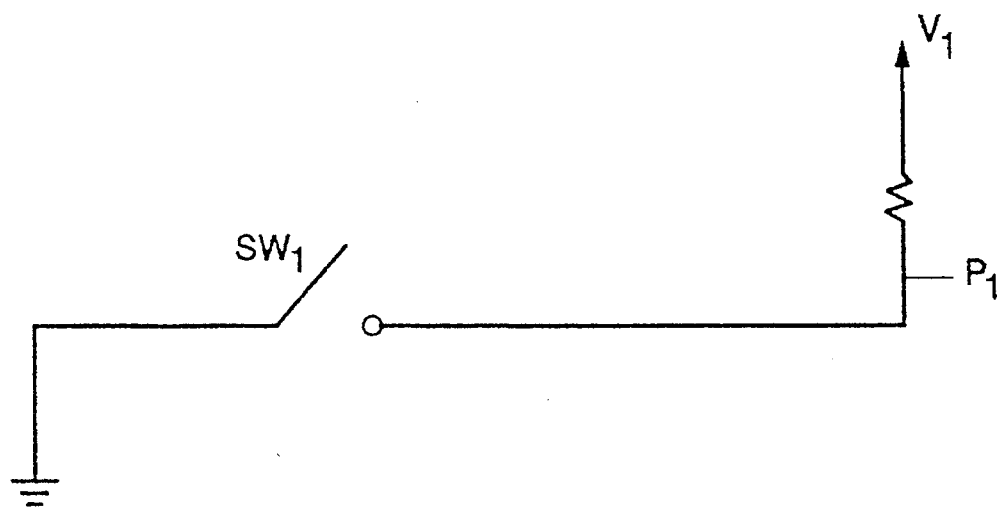
FIG. 11 is a circuit diagram of conventional video recorder pull-tab sensor circuitry.
Figure 12:
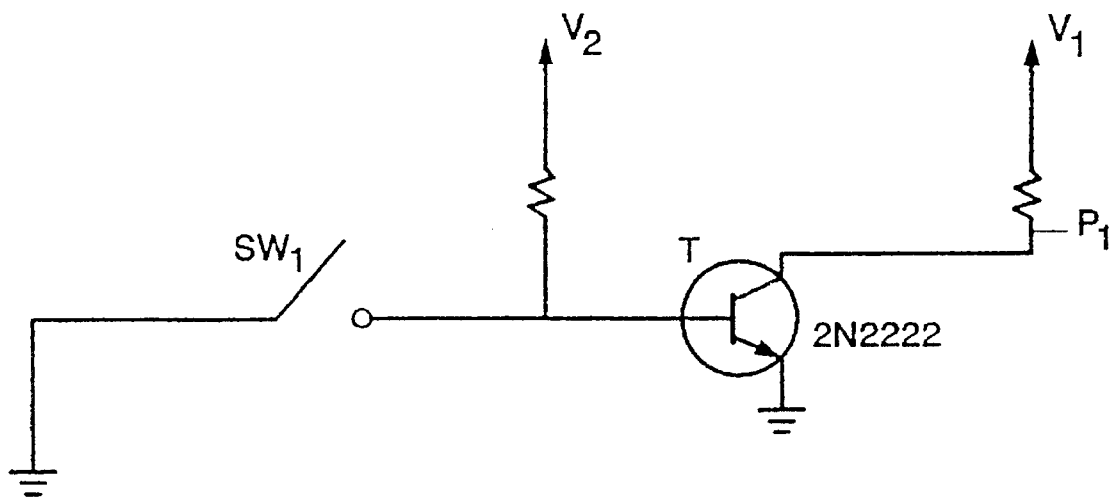
FIG. 12 is a circuit diagram of video recorder pull-tab sensor circuitry according to the present invention.

FIGS. 11 and 12 show circuit diagrams for conventional pull tab sensor circuitry and sensor circuitry according to the present invention, respectively. In FIG. 11, the pull tab mechanism operates switch $SW_1$ such that the voltage at $P_1$ is equal to the ground voltage or $v_1$ (e.g., 5v) depending on whether or not the tab has been pulled. The resulting signal functions to enable or disable the recording circuitry in conventional fashion. According to the present invention, circuitry is interposed between switch $SW_1$ and $P_1$ to substantially reverse the signal output to the recording circuitry. As shown in FIG. 12, this is accomplished by interposing bipolar junction transistor T between switch $SW_1$ and $P_1$, where transistor T is biased by voltage $V_2$ (e.g., 12v).

It will thus be appreciated that the cooperation of the video tape 60/pull tab 62 and probe mechanism 66 is functionally opposite to conventional systems, i.e., the pull tab 62 must be removed to enable recording using the video recording assembly 10. Accordingly, the process of removing pull tab 62 to enable recording using video recording assembly 10 will disable subsequent recording or erasure on conventional video units as may be used for independent user playback.

Figure 10:
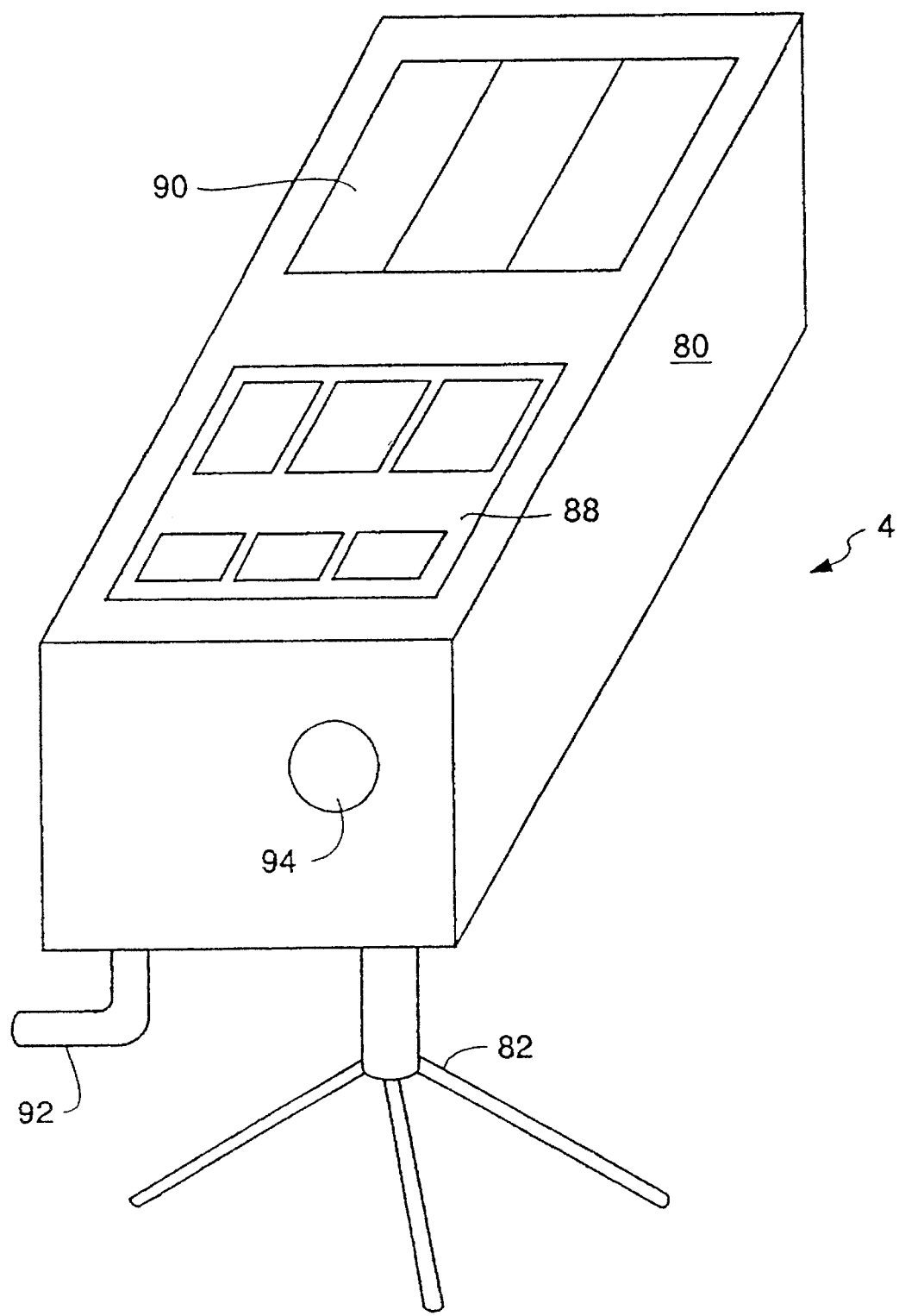
FIG. 10 is a perspective view of the measuring device of the system of FIG. 1.

Referring to FIGS. 2 and 10, measuring device 4 provides parameter information which can be correlated to the video taped activity for training or feedback purposes. Although other types of sensors may be used to determine other parameter information, the illustrated device 4 is particularly adapted for determining estimated golf ball carry distance and can be constructed in accordance with U.S. Pat. No. 5,246,232 and U.S. Patent application Ser. No. 08/085,303 both of which are incorporated herein by reference. Generally, the device 4 operates on the principle that estimated carry distance can be calculated based on information related to initial golf ball speed, as measured through use of a Doppler radar detector, and trajectory information determined based on information entered by the user regarding the golf club employed.

Device 4 includes a housing 80 adjustably mounted on a support such as tripod 82 at the user activity site 6 so as to permit aiming of the device 4 to monitor an initial portion of the trajectory 84 of golf ball 86. A keypad 88 on housing 80 allows the user to enter data regarding the golf club employed, the units for display of the carry distance (e.g., meters, feet, yards, etc.) or other information as desired. LCD display 90 or housing is used to display estimated carry distance for convenient viewing by the user during the practice session. The device 4 further includes a microphone 92 for detecting the sound of a ballstrike, an outlet 94 for connecting line 96 to interface device 4 with the video recording assembly 10 and microcomputer 28, Doppler radar transmitter and receiver components mounted on the front of housing 80, and an internal processor for performing the estimated carry distance calculations.

During use, a carry distance estimation is initiated upon detection of a ballstrike by microphone 92. A corresponding ballstrike signal from microphone 92 triggers operation of the Doppler radar components to emit pulsed radar signals and receive echo signals reflected by the golf ball 86 in flight. Information obtained from the emitted and echo signals is then processed by the internal processor to provide initial golf ball speed related data. In addition to this golf ball data, information relating to the angle θ of trajectory 84 affects estimated carry distance. Rather than measuring θ directly, the device 4 determines carry distance based on a determination of relative velocity, i.e., a velocity component relative to the axis defined by the device and an initial golfball position, as described in the above-referenced U.S. Patent application Ser. No. 08/085,303. An advantage of calculating carry distance based on such a relative velocity determination is that the user need not enter golf club information. If such club information is desired, the user can simply speak and the information will be recorded in the audio portion of the video record. Alternatively, the illustrated device 4 can determine estimated carry distance based on the golf club information entered by the user in conjunction with stored data correlating the golf club information to estimated values of carry distance. Specifically, the stored data can be derived based on controlled calibration tests for correlating actual carry distance to detected golf ball information for various golf clubs. The estimated carry distance is displayed on display 90.

Information is also communicated from device 4 to video recording assembly 10 and microcomputer 28 for video tape display, computer storage and/or further analysis employing, for example, swing or club flex analysis software. In this regard, the same estimated carry distance displayed on display 90 can be simultaneously superimposed on the video record of video tape 60 using known video mixing techniques. In the same manner, the golf club information entered into device 4 can be transmitted to assembly 10 for superimposition on the video record of video tape 60. Various other types of information, e.g., average carry distance for a practice session or per club, can be determined using microprocessor 28 and superimposed on the video record of video tape 60 or stored for further analysis or presentation in a table or graphical format.

Referring now to FIG. 5, the control unit 23 employs microcomputer 28 to control operation of the system's various components. The microcomputer 28 is preferably the MC68HC705C8 microcomputer produced by Motorola, Inc. and is preferably configured as described in the Motorola HCO5 (MC68HC705C8) technical data manual, Manual No. MC68HC708C8/D REV 1 C. 1990 and HCO5 (M68HCO5) applications guide, manual No. M68HCO5AG/AD C. 1991, which are hereby incorporated by reference. The microcomputer 28 receives signals from the bill acceptor 19 and the push button 18 and provides output to the LCD display 17. The bill acceptor 19 indicates the amount of money that has been deposited, and the microcomputer 28 calculates the amount of money that remains to be deposited for one credit or one session. This amount is displayed on the LCD display 17. The microcomputer 28 includes an internal timer which counts the amount of time for a session corresponding to one credit. The microcomputer 28 is also coupled through a counter driver circuit 29 to an external counter 30. The microcomputer 28 uses the counter 30 to tally the number of uses or credits received by the assembly 10 for auditing purposes. The counter 30 is preferably an electro-mechanical counter and is tamper-resistant.

The microcomputer 28 provides output to a level shifter 31 which in turn provides control signals to the video recorder 22 to control the video recorder 22. The level shifter 31 converts the TTL outputs from the microcomputer 28 into open collector signals which can be received by the logic used in the video recorder 22. The microcomputer 28 provides signals through the level shifter 31 to the video recorder 22 to turn on and turn off the video recorder 22, to begin and end recording, and to eject the video tape from the video recorder 22. The microphone 11 provides an audio signal to the video recorder 22 and the video camera 9 provides a video signal to the video recorder 22. The microphone 11 requires a preamplifier, as shown. An additional signal is provided to the video recorder 22 by the parameter measuring device 4.

The video recorder 22 also provides a video output to a video detector 32 which in turn outputs a control signal to the microcomputer 28. The video detector 32 can use the LM1881 video sync separator produced by National Semiconductor. The LM1881 is configured as shown in the Natural Semiconductor Linear Data Book, Vol. 3, 1988 edition, p. 3-54 to p. 3-3-60, which is hereby incorporated by reference. The video detector 32 receives the video output from the video recorder 22 and provides an indication to the microcomputer 28 as to whether the video recorder 22 is actually on. This is necessary because the power control signal provided from the microcomputer 28 to the video recorder 22 is merely a pulse or toggle which alternately turns on and turns off the video recorder 22. Because of this, it is difficult for the microcomputer 28 to actually know whether the video recorder 22 is on or off. Therefore, the video detector 32 provides a signal to the microcomputer 28 indicating whether power is on to the video recorder 22 and whether a video signal originating from the camera 9 is being received from the video recorder 22. In this regard, where a subaudible tone is recorded into the video record, e.g., for authorization purposes as described above, detection of the tone can provide a positive indication that the recorder 22 is on and recording has begun. An advantage of using the subaudible tone for recorder feedback is that such feedback can be provided through convenient modifications to a variety of video units. Similarly, a video tape inspector unit 33, which receives a signal from probe mechanism 66 of video recorder 22 and provides a signal to microcomputer 28, can be provided to indicate whether an authorized video tape has been inserted.

Record time and pricing for one practice session are set by DIP switches 44 of control unit 23 and connected to the microcomputer 28. The DIP switches 44 are factory preset and can be changed only by an owner or lessee of the unit. In other words, the user is unable to affect the record time or pricing of a session. The pricing of a session can be set to any dollar amount, preferably between $5 and $20 dollars in $5 increments, and the record time is preferably set from five minutes to eighty-five minutes in five minute increments. Adjustments between time and pricing may be made independently of each other.

Figure 6A:
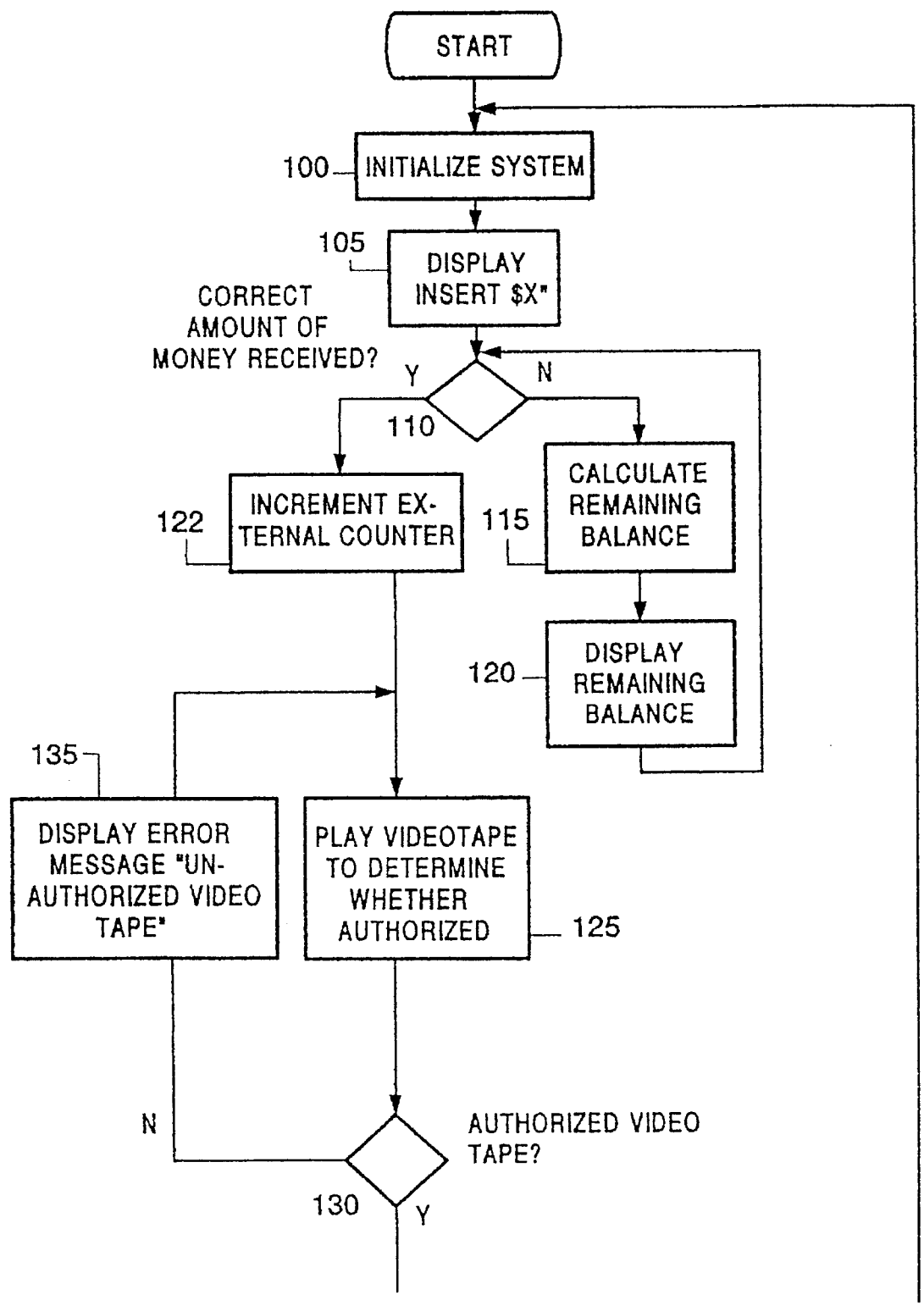
FIGS. 6A and 6B are flowchart diagrams illustrating operation of the video recording system of the invention.
Figure 6B:
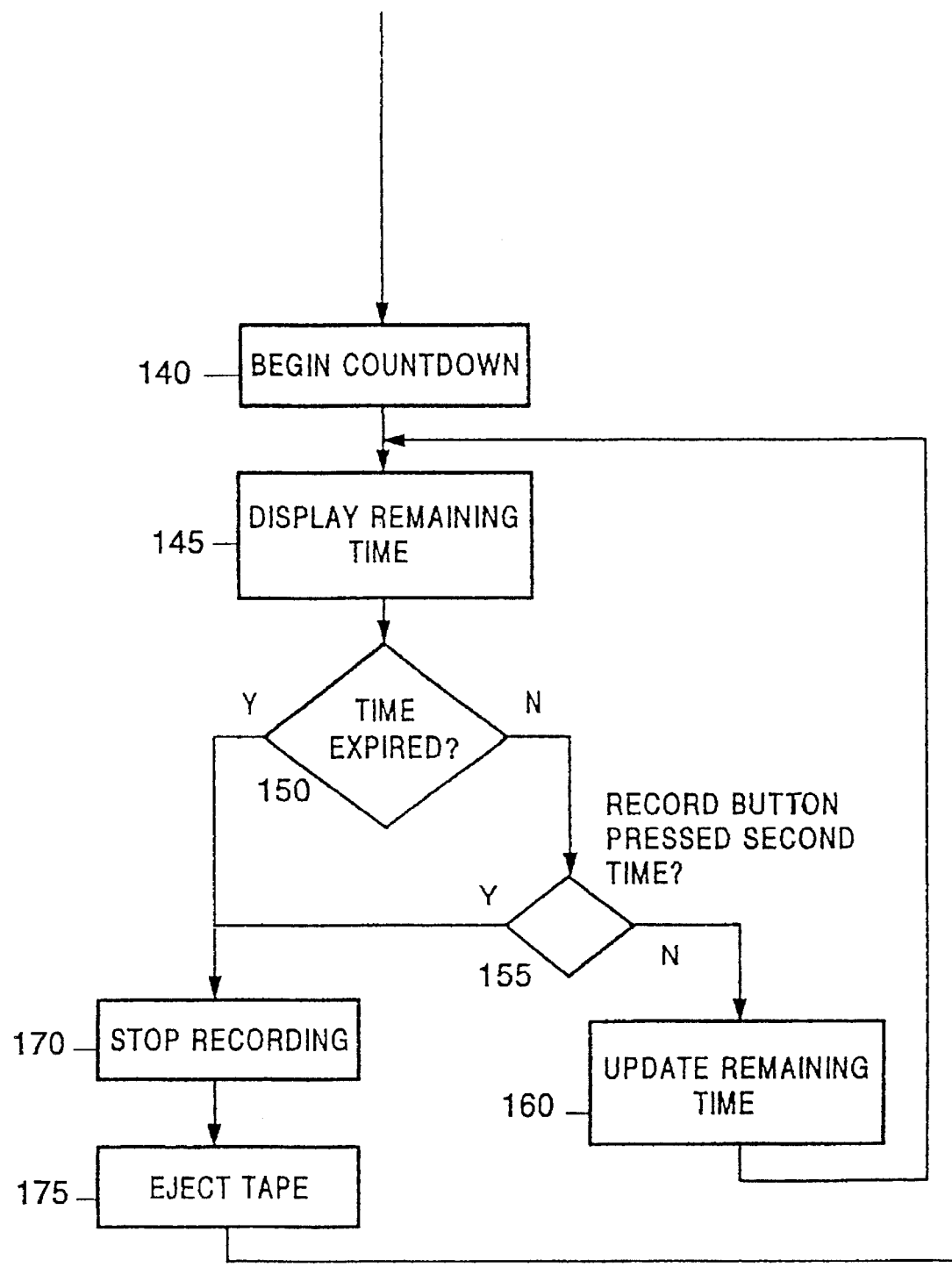

Referring now to FIGS. 6A and 6B, a flowchart diagram illustrating operation of the microcomputer 28 in the golf swing recording apparatus is shown. In step 100, the microcomputer 28 initializes the system. This initialization step is discussed further below with regard to FIG. 7. In step 105, the microcomputer 28 displays the message "INSERT $X" on the LCD 17. The value for "X" is determined by the DIP switches 44 and refers to the amount of money required for one credit or one session, which lasts a period of time also determined by the DIP switches 44. In an alternative embodiment, no preset amount X is required to be inserted for a session, but rather money can be inserted in, for example, $5 increments, to add, for example, additional 10 minute blocks of recording time.

In step 110 the microcomputer 28 checks the bill acceptor 19 to determine if the entire sum has been received for one credit. If the total amount has not been received, then in step 115 the microcomputer 28 calculates the remaining balance and in step 120 displays the remaining balance on the LCD 17. The microcomputer then returns to step 110 and again determines whether the correct amount of money has been received. When the correct amount of money is received, the microcomputer 28 in step 122 increments the external timer 30. In step 125, the user inserts the video tape and presses the record button thereby prompting the assembly 10 to inspect the tape.

In step 130 the assembly 10 investigates the video tape to determine whether it is an authorized video tape. If the tape is unauthorized, an error message is displayed in step 135. In step 140 (FIG. 6B), the microcomputer 28 receives signals from the video recorder 22 indicating that the practice session has begun and the microcomputer 28 starts the internal counter. In step 145, the time remaining in the session is displayed on the LCD 17. The length of time counted by the internal counter is set using the time value stored in the DIP switches 44. Any time after the first 30 seconds of recording time the record button 18 may be pushed to terminate the recording session early. If the time has not expired as determined in step 150 and the record button 18 has not been pushed a second time as determined in step 155, then in step 160 the microcomputer 28 updates the remaining time and then returns to step 145. When the time has been determined to have expired in step 150, or the session has been terminated early in step 155, the microcomputer 28 stops the recorder 22 in step 170 and directs the recorder 22 to eject the tape in step 175. The microcomputer 28 then returns to step 100 and begins the above process again for the next user.

Figure 7:
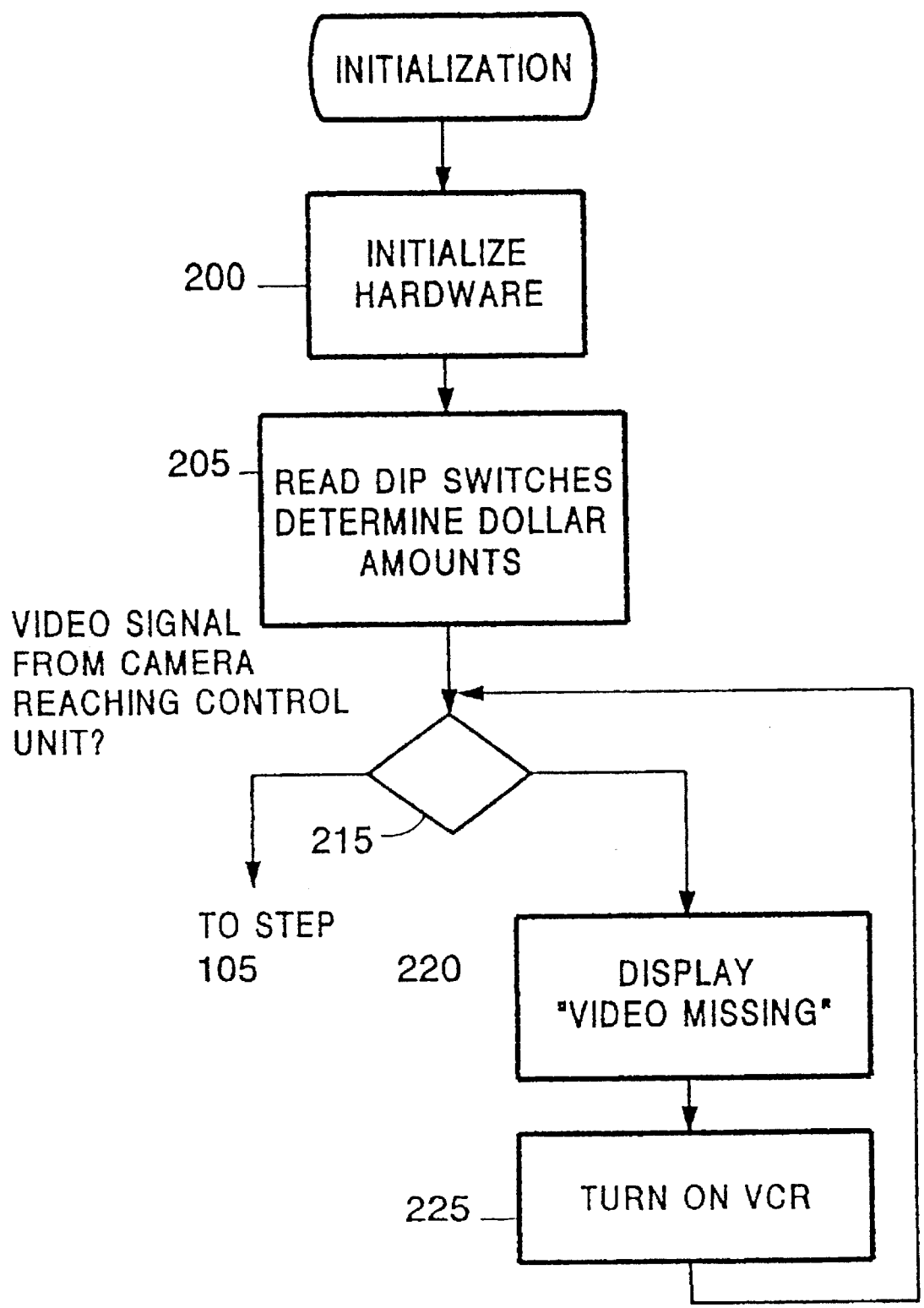
FIG. 7 is a flowchart diagram of the initialization process performed in FIG. 6A.

Referring now to FIG. 7, the initialization procedure for the system of the present invention performed in step 100 of FIG. 6A is shown. In step 200 the microcomputer 28 initializes various hardware in the assembly 10. The microcomputer 28 sets the internal counter, bill acceptor 19, recorder 22, LCD 17 to a known initial position. In step 205 the DIP switch settings are read to determine values for time in minutes and dollars required for 1 credit or one session. The internal counter is then initialized based on the setting of the respective DIP switches 44. In step 215 the microcomputer 28 determines if it is receiving a video signal from the video recorder 22. If a video signal is not detected in step 215, then in step 220 the microcomputer 28 displays the message "VIDEO MISSING" on the LCD 17 and provides a toggle "power" signal in step 225 to "turn on" the recorder 22. The microcomputer 28 then returns to step 215 to again determine if a video signal is being received from the recorder 22. If a video signal is received, the microcomputer 28 advances to step 105 (FIG. 6A).

Therefore, after payment for one session has been received by the bill acceptor 19 and acknowledged by the control unit 23, the control unit 23 requests the user to insert a VHS tape and press the record button 18. Once these functions have been performed by the user, and the tape has been investigated to determine that it is on authorized tape, the control unit 23 counts down the preset amount of time until termination of the session. During this time, the user practices on the driving range, the assembly 10 records the user's swing and, if desired, device 4 records parameter information for display on the tape. Also, the time remaining is displayed on the LCD display 17. At the end of the preset time period, the control unit 23 instructs the recorder 22 to eject the tape. If the user desires to terminate the recording period prior to the scheduled time, he/she may press the record button 18 a second time, and the control unit 23 will terminate the session, eject the tape, and reset the assembly 10 for a new user. The counter 30 keeps track of the number of sessions performed, i.e., the amount of credits paid into the bill acceptor 19, for auditing purposes.

While the system of the present invention has been described in connection with the preferred embodiment, it is not intended to limit the invention to the specific form set forth herein, but on the contrary, it is intended to cover such alternatives, modifications, and equivalents as may be included within the spirit and scope of the invention as defined by the appended claims.

What is claimed is:

1. A method for providing a combined informational and training video product for use by a user to improve performance with respect to a skilled physical activity performed by the user, the method comprising the steps of:

recording at least a first informational video segment on a first video record portion of a video unit, said first informational video segment including physical activity-specific information corresponding in type with said skilled physical activity performed by said user, said physical activity specific information comprising one of instructional information and product related information relating to said skilled physical activity;

disposing a video recording assembly at a given user activity site adapted to accommodate said skilled physical activity;

providing said video unit to a given user for use in said video recording assembly at said user activity site, wherein a video record of said video unit is cued for recording user-specific information corresponding to said skilled physical activity performed by said user on a second video record portion different from said first video record portion;

utilizing said video recording assembly to record a skilled physical activity performed by said user; and providing said video unit to said user for independent replay by said user, whereby said user receives a combination of physical activity-specific information and user-specific information relative to said skilled physical activity performed by said user such that said user can reflect upon said skilled physical activity performed by said user at said user activity site and said physical activity specific information to improve performance with respect to said skilled physical activity.

2. The method of claim 1, wherein said step of recording comprises:

pre-recording said first informational video segment on a master; and copying said master onto said first video record portion of said video unit.

3. The method of claim 1, further comprising the step of providing an indicator to indicate that said video unit is authorized for use in connection with said video recording assembly.

4. The method of claim 3, wherein said step of providing an indicator comprises encoding a signal into said video record of said video unit.

5. The method of claim 4, wherein said step of encoding comprises recording an audio or optical signal into said video record.

6. The method of claim 3, wherein said step of providing an indicator comprises providing said video unit with a selected physical attribute.

7. The method of claim 6, wherein said step of providing said video unit with a selected physical attribute comprises removing a pull tab.

8. The method of claim 3, wherein said step of providing an indicator comprises providing a bar code on said video unit.

9. The method of claim 3, wherein said step of providing an indicator comprises imparting a selected radiation transmission or reflection property to at least a portion of said video unit.

10. The method of claim 1, wherein said step of utilizing said video recording assembly comprises investigating said video unit for an indicator indicating that said video unit is authorized for use in connection with said video assembly.

11. The method of claim 10, wherein said step of investigating comprises employing a signal indicative of a physical characteristic of said video unit.

12. The method of claim 10, wherein said step of investigating comprises applying an electromagnetic signal to said video unit.

13. The method of claim 10, wherein said step of investigating comprises analyzing said video record of said video unit.

14. The method of claim 1, further comprising the steps of:

assessing a quality of performance associated with said activity performed by said user; and reporting said quality of performance.

15. The method of claim 14, wherein said step of reporting comprises recording said parameter information in said video record.

16. The method of claim 1, further comprising the step of recording a signal on a third video record portion of said video unit for detection by said video recording assembly, said third video record portion being different from said first and second video record portions, wherein said signal provides information to said video recording assembly for use by said video recording assembly in processing said video unit.

17. The method of claim 16, wherein said signal is recorded at a beginning portion of said video record.

18. The method of claim 16, wherein said signal comprises a sub-audible tone.

19. The method of claim 14, wherein said step of reporting said parameter information comprises superimposing said parameter information on said second video record portion, wherein, upon replay, said parameter information is displayed together with said recorded activity performed by said user.

20. A method for providing a combined informational and training video product corresponding to a physical activity performed by a user, the method comprising the steps of:

recording at least a first informational video segment on a first video record portion of a video unit, said first informational video segment including physical activity-specific information corresponding in type with said physical activity performed by said user;

disposing a video recording assembly at a given user activity site;

providing said video unit to a given user for use in said video recording assembly at said user activity site, wherein a video record of said video unit is cued for recording user-specific information corresponding to said physical activity performed by said user on a second video record portion different from said first video record portion;

utilizing said video recording assembly to record a physical activity performed by said user;

determining parameter information regarding an aspect of said physical activity performed by said user;

reporting said parameter information; and providing said video unit to said user for independent replay by said user, whereby said user receives a combination of physical activity-specific information and user-specific information relative to said physical activity performed by said user wherein said physical activity comprises golf and said step of determining parameter information comprises measuring a value related to golf ball travel.

21. The method of claim 20, wherein said step of determining parameter information comprises determining a golf ball travel distance corresponding to a recorded golf shot, and said step of reporting said parameter information comprises superimposing said golf ball travel distance on a portion of said video record corresponding to said golf shot.

22. A method for providing a video product corresponding to a skilled physical activity performed by a user, the method comprising the steps of:

disposing a video recording assembly at a given user activity site adapted to accommodate said skilled physical activity;

providing a video unit to a given user for use in said video recording assembly at said user activity site, wherein a video record of said video unity is cued for recording user-specific information corresponding to said skilled physical activity performed by said user;

utilizing said video recording assembly to record said skilled physical activity performed by said user at said user activity site;

assessing a quality of performance associated with said skilled physical activity performed by said user;

superimposing information regarding said quality of performance on a video record portion of said video unit corresponding to said physical activity performed by said user; and providing said video unit to said user for independent replay by said user, whereby said user receives a combination of video information regarding said physical activity performed by said user at said user site and parameter information corresponding to said physical activity.

23. A method for providing a video product corresponding to a physical activity performed by a user, the method comprising the steps of:

disposing a video recording assembly at a given user activity site;

providing a video unit to a given user for use in said video recording assembly at said user activity site, wherein a video record of said video unit is cued for recording user-specific information corresponding to said physical activity performed by said user;

utilizing said video recording assembly to record said physical activity performed by said user at said user activity site;

determining parameter information regarding an aspect of said physical activity performed by said user;

superimposing said parameter information on a video record portion of said video unit corresponding to said physical activity performed by said user; and providing said video unit to said user for independent replay by said user, whereby said user receives a combination of video information regarding said physical activity performed by said user at said user site and parameter information corresponding to said physical activity wherein said physical activity comprises golf and said step of determining parameter information comprises measuring a value related to golf ball travel.

* * * * *